Figure 3:
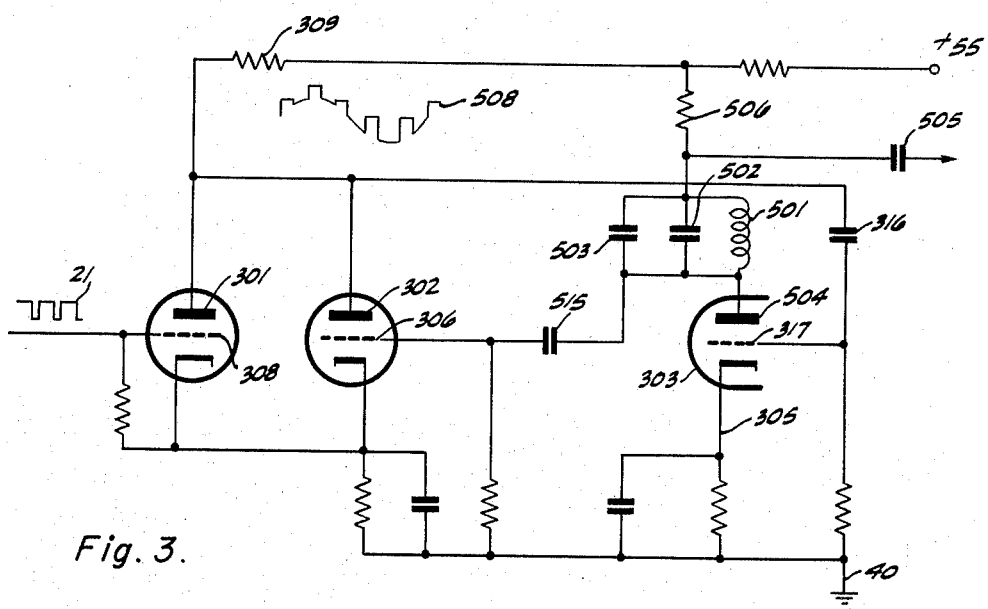

Nov. 11, 1958
H. B. BROOKS
2,860,247
FREQUENCY DIVIDER
Original Filed Feb. 23, 1954
2 Sheets-Sheet 1
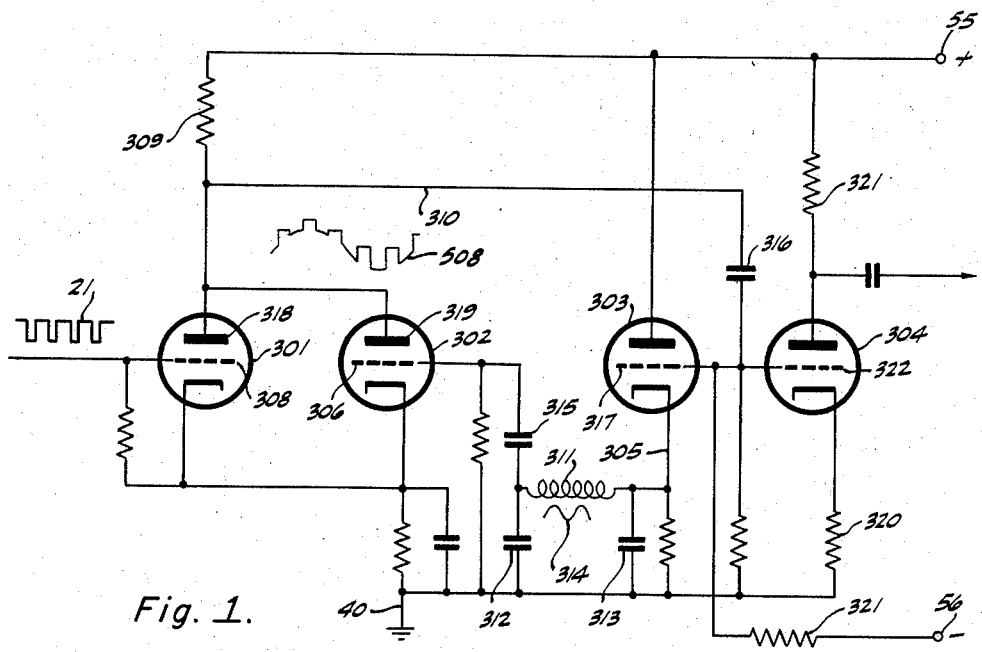
Fig. 1.
Fig. 2.
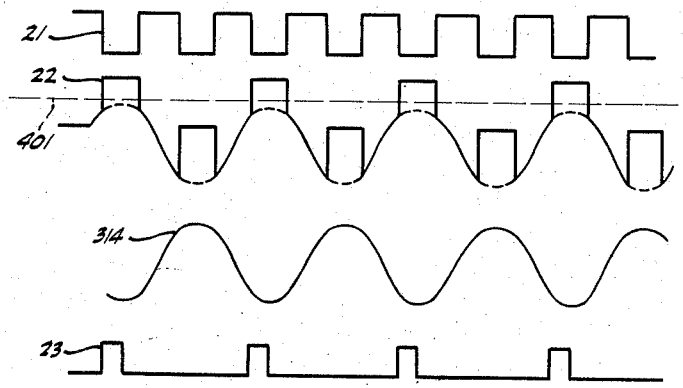
INVENTOR.
Herbert B. Brooks,
BY
AGENT.

INVENTOR.
Herbert B. Brooks,

BY

AGENT.

United States Patent Office 2,860,247
Patented Nov. 11, 1958

1

2,860,247

FREQUENCY DIVIDER

Herbert B. Brooks, Tucson, Ariz., assignor to Hughes Aircraft Company, Culver City, Calif., a corporation of Delaware Original application February 23, 1954, Serial No. 411,630, now Patent No. 2,752,497, dated June 26, 1958. Divided and this application March 1, 1957, Serial No. 643,337

3 Claims. (Cl. 250—36)

This invention relates to frequency dividers and more particularly to an accurate frequency divider circuit capable of pulsed operation.

The present application is a division of my copending application Serial No. 411,630, filed on February 23, 1954, entitled "Crystal-Controlled Marker Generator," and assigned to the assignee of this application, now Patent No. 2,752,497 issued June 26, 1956.

In a crystal-controlled marker generator such as described in the above-mentioned copending application frequency divider circuits may be used which must retain their accuracy of division despite the fact that the circuits are excited periodically by the application of pulses. This type of excitation is known as "pulsed operation." In prior art circuits for frequency division the pulsing of the circuit would cause an impairment of the accuracy of the divider circuits.

Accordingly it is an object of this invention to provide a frequency divider circuit of high accuracy and stability capable of intermittent pulsed operation.

It is another object of this invention to provide a frequency divider circuit wherein a series of pulses applied to the circuit excites an oscillatory wave having a frequency subharmonically related to the frequency of the applied pulses and deriving output pulses therefrom having the same ratio as the subharmonic ratio.

In the present invention the accuracy of division is maintained by virtue of the fact that an oscillatory wave having a subharmonic relation to applied pulses is applied to a circuit which is normally cut off except for the most positive portions of the oscillatory wave. The oscillatory wave is excited by the applied pulses. This circuit also receives the input pulses for which frequency division is sought. The mixed wave resulting thereby has a positive pulse superimposed on the crest of the positive portion of the oscillatory wave while all pulses occurring between the crests never achieve an amplitude above the cut-off value. Therefore a division occurs equal to the ratio of the number of pulses in the trough to the pulse on the crest of the wave.

Figure 4:
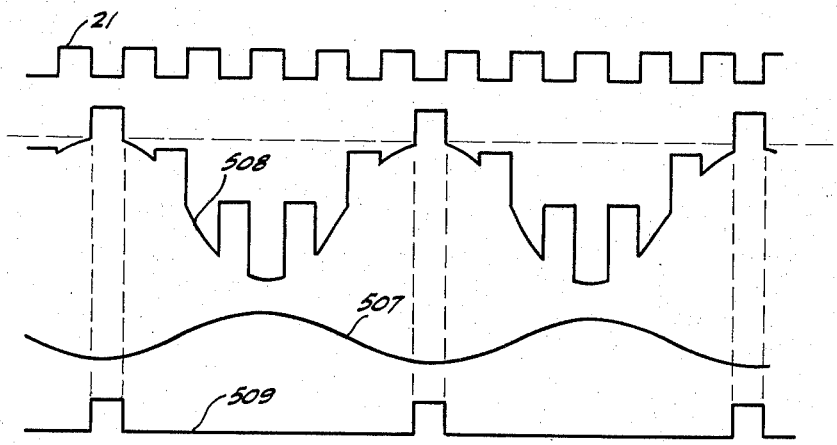

These and other objects will become apparent from the specification and claims which follow taken together with the drawing, in which Fig. 1 is a circuit diagram of a frequency divider according to this invention, Fig. 2 is a graph illustrating a series of waveforms showing the operation of the circuit of Fig. 1;

Fig. 3 is an alternate species of the frequency divider device of the present invention; and Fig. 4 illustrates several waveforms associated with the operation of the device of Fig. 3.

A frequency divider circuit of the present invention is shown in Fig. 1. Waveforms are shown in Fig. 2 to illustrate the operation of the divider circuit of Fig. 1.

Referring to Fig. 1 triode 301 is an amplifier for the input pulses, 21. Triodes 302 and 303 in conjunction with resonant feedback circuit 311, 312, 313 and 315 constitute an oscillation generator.

2

The common output load circuit 309 coupled to anode 318 and 319 of triodes 301 and 302, respectively, causes mixing of the pulses from anode 318 and the oscillatory sine wave from anode 319 to form a composite wave 22.

In order to obtain a division of two with respect to the input pulses, the triode 304 is biased to a negative potential such that conduction occurs only during the more positive excursions of the composite wave 22 whereby only these more positive excursions are developed at the output thereof. In particular, triode 304 has a cathode bias resistor 320 connected between its cathode and ground, and a plate load resistor 321 connected between its plate and a B+ terminal 55.

During operation, rectangular negative going input pulses 21 are impressed on the input of the circuit of Fig. 1 at the grid 308 of triode 301. At the load resistor 309 comon to both triodes 301 and 302 positive pulses appear due to their generation in tube 301. The positive pulses are coupled through capacitor 316 to grid 317 of triode 303. A positive pulse is developed in cathode 305 of cathode follower 303 as a result of each positive pulse in the grid. The tuned circuit 311, 312, 313 may be made resonant at one-half the pulse repetition rate of wave 21. As a result a sine wave 314 at half the frequency of wave 21 is generated in the foregoing described tuned circuit in response to each pulse developed at the cathode 305. The sine wave is applied to grid 306 through capacitor 315. The positive half portions of the sine wave 314 applied to grid 306 results in negative going portions of the sine wave being developed in the plate circuit of triode 302 which negative portions are combined across common load resistor 309 with the positive pulses developed in the plate circuit of triode 301. The negative half cycle portions of sine wave 314 applied to grid 306, on the other hand, result in positive going portions which are combined with the next positive going pulse developed across common plate load resistor 309. The waveform 22 results at the common plate lead 310.

It may be seen then that waveform 22 now includes one of the positive pulses developed in the plate circuit 318 of triode 301 for each half cycle of the sine wave appearing at the plate circuit 319 of triode 302. Because the plates of triodes 301 and 302 are conected together the common plate load resistor 309 of the two triodes 301 and 302 will algebraically and additively combine the pulse wave 21 and sine wave 314 applied respectively at the grids of triodes 301 and 302. The resulting composite wave 22, then, has a waveform including positive pulses appearing alternately at the crest and in the valley or trough of the sine wave. It may be seen that if a voltage with a waveform of the composite wave 22 is applied to an amplifier, biased appropriately, only the most positive going peaks will be amplified. Those failing to exceed the cut-off bias level to which the amplifier is adjusted fail to appear in the output with the result that the output signal of such a pulse amplifier will consist of one pulse for each two of the pulses 21 applied at grid 308 of triode 301.

Triode 304 functions as an overbiased pulse amplifier such as described above. Negative bias applied to the grid 322 by source 56 and resistor 321 maintains the triode 304 at a level of low plate current. This level is such that only when the voltage of waveform 22 applied to grid 322 exceeds the bias level will conduction result. The dashed line 401 in Fig. 2 illustrates the bias level above which triode 304 conducts. The output waveform developed in the plate circuit of triode 304 is then similar to waveform 23 of Fig. 2.

It is sometimes desirable to divide a fundamental marker frequency or other source of pulse by five. A 5:1 frequency divider is shown in Fig. 3. The operation of the circuit of Fig. 3 is quite similar to the operation of the circuit of Fig. 1. Elements of Fig. 3 that are identical with those of Fig. 1 bear the same reference characters. The waveforms of Fig. 4 are illustrative of the operation of the circuit of Fig. 3.

In the plate circuit of triode 303 (Fig. 3) there is provided a tuned circuit comprising inductor 501 and capacitors 502 and 503 connected between plate 504 and a load resistor 506. An output coupling capacitor 505 is connected from the junction of the tuned circuit 501, 502, 503, and load resistor 506 to an external circuit (not shown). Coupling capacitor 515 is connected between plate 504 and grid 306.

The tuned circuit 501, 502, 503 in the plate circuit 504 has a resonant frequency of one-fifth of the pulse frequency and otherwise has a similar function to that of the tuned circuit 311, 312, 313 which is connected, however, in the cathode circuit of triode 303 in Fig. 1.

Operating in a manner similar to that of the circuit of Fig. 1, the tuned circuit of Fig. 3 develops a sine wave when excited by pulses such as 21 when these pulses are applied through triode 301 and capacitor 316 to triode 303. The sine wave 507 (Fig. 4) is applied to grid 306.

It can be seen that in the same manner as described above for Fig. 1, the wave 507 and pulses 21 are mixed across the common plate circuit 309 of the triodes 301 and 302 to form composite wave 508 illustrated in both Figs. 3 and 4. If the composite wave 508 is applied to a circuit, not shown, but such as described above in connection with triode 304 (Fig. 1), the resulting waveform would be as shown at 509 in Fig. 4. Output pulse waveform 509 has one pulse for each five of input pulse waveform 21.

Since the pulses of waveform 21 as applied either to the circuit of Fig. 1 or to that of Fig. 3, are assumed to be accurately spaced, due to the control of a quartz crystal circuit as described in the above-mentioned co-pending application, then it follows that the pulses of waveform 23 (Fig. 2) and 509 (Fig. 3) will be spaced equally as accurately. This is true because the frequency dividers of Fig. 1 and Fig. 3, each merely suppress the unwanted pulses. The remaining pulses retain their original spacing as controlled by the quartz crystal circuit.

The frequency dividers of Fig. 1 and Fig. 3 may be operated in series to provide combinations such as, for example, 10:1—or even greater ratios. Either of the circuits of Fig. 1 or Fig. 3 may be used for other than the exact dividing ratio specified above. That is the circuit of Fig. 3 may give division ratios greater or less than 5 to 1 and the circuit of Fig. 1 may be used for division ratios greater than 2 to 1.

Thus, the elements of the frequency divider of this invention are such that it is possible to produce pulse marker having a subharmonic ratio to the frequency of pulses applied to the frequency divider wherein the marker pulses will have the same spacing accuracy as the pulses of the applied signals.

What is claimed is:

1. A frequency divider circuit comprising: a pair of amplifying devices having independent input circuits and a common output circuit adapted to mix signals applied, respectively, to each of said input circuits; a pulse excited and synchronized oscillator, having an input circuit coupled to said common output circuit and a resonant output circuit coupled to one of said mixing input circuits, said resonant output circuit having a natural resonant frequency which is subharmonically related to a predetermined input pulse frequency, whereby said oscillator operates at said subharmonic frequency; and a negatively biased pulse amplifier also coupled to said common output circuit, whereby pulses applied to the remaining one of said mixing input circuits are applied to said oscillator to excite said oscillator to produce sine waves at said subharmonic frequency, said sine waves being applied to said one of said mixing input circuit, said sine waves and said pulses being mixed to produce a composite wave, said composite wave being applied to said pulse amplifier, said pulse amplifier being responsive only to the most positive portions of said composite wave to produce pulses having the same repetition frequency as the frequency of said sine waves.

2. A frequency divider circuit comprising: a pair of amplifiers having independent input circuits and a common output circuit adapted to mix signals applied individually to each of said input circuits; a pulse excited and synchronized oscillator, having an anode circuit and a cathode circuit, and a resonant output circuit coupled between said anode circuit and one of said mixing input circuits, said resonant output circuit having a natural resonant frequency which is subharmonically related to a predetermined input pulse frequency, whereby said oscillator operates at said subharmonic frequency; and a negatively biased pulse amplifier also coupled to said common output circuit, whereby pulses applied to the remaining one of said mixing input circuits are applied to said oscillator to excite said oscillator to produce sine waves at said subharmonic frequency, said sine waves being applied to said one of said mixing input circuit, said sine waves and said pulses being mixed to produce a composite wave, said composite wave being applied to said pulse amplifier, said pulse amplifier being responsive only to the most positive portions of said composite wave to produce pulses having the same repetition frequency as the frequency of said sine waves.

3. A frequency divider circuit comprising: a pair of amplifiers having independent input circuits and a common output circuit adapted to mix signals applied individually to each of said input circuits; a pulse excited and synchronized oscillator, having an anode circuit and a cathode circuit, and a resonant output circuit coupled between said cathode circuit and one of said mixing input circuits, said resonant output circuit having a natural resonant frequency which is subharmonically related to a predetermined input pulse frequency, whereby said oscillator operates at said subharmonic frequency; and a negatively biased pulse amplifier also coupled to said common output circuit, whereby pulses applied to the remaining one of said mixing input circuits are applied to said oscillator to excite said oscillator to produce sine waves at said subharmonic frequency, said sine waves being applied to said one of said mixing input circuits, said sine waves and said pulses being mixed to produce a composite wave, said composite wave being applied to said pulse amplifier, said pulse amplifier being responsive only to the most positive portions of said composite wave to produce pulses having the same repetition frequency as the frequency of said sine waves.

References Cited in the file of this patent

UNITED STATES PATENTS

| 2,277,000 | Bingley | Mar. 17, 1942 |
| 2,762,923 | Quinn | Sept. 11, 1956 |

FOREIGN PATENTS

| 479,935 | Great Britain | Feb. 14, 1938 |